(12) United States Patent
Wachtelaer et al.

(10) Patent No.: US 10,145,398 B2
(45) Date of Patent: Dec. 4, 2018

(54) QUICK RELEASE MECHANISM FOR NON-RELEASABLE CLIPS

(71) Applicant: RAPIDFIT NV, Leuven (BE)

(72) Inventors: Jori Wachtelaer, Leuven (BE); Jan Billen, Leuven (BE)

(73) Assignee: RAPIDFIT, NV, Leuven (BE)

( * ) Notice: Subject to any disclaimer, the term of this patent is extended or adjusted under 35 U.S.C. 154(b) by 124 days.

(21) Appl. No.: 15/304,562

(22) PCT Filed: Apr. 16, 2015

(86) PCT No.: PCT/EP2015/058232
§ 371 (c)(1),
(2) Date: Oct. 17, 2016

(87) PCT Pub. No.: WO2015/158804
PCT Pub. Date: Oct. 22, 2015

(65) Prior Publication Data
US 2017/0122348 A1    May 4, 2017

Related U.S. Application Data

(60) Provisional application No. 61/980,797, filed on Apr. 17, 2014.

(51) Int. Cl.
*F16B 2/10* (2006.01)

(52) U.S. Cl.
CPC ...................... *F16B 2/10* (2013.01)

(58) Field of Classification Search
CPC ......................................... F16B 2/10
(Continued)

(56) References Cited

U.S. PATENT DOCUMENTS

| | | | | |
|---|---|---|---|---|
| 4,716,811 | A | * | 1/1988 | Johnson .................. F41A 23/50 24/495 |
| 8,550,413 | B2 | * | 10/2013 | Warrick .................... A61J 1/16 248/229.22 |

(Continued)

OTHER PUBLICATIONS

International Search Report—PCT/EP2015/058232 (WO 2015/158804)—ISA/EPO—dated Jul. 10, 2015.

*Primary Examiner* — G. Bradley Bennett
(74) *Attorney, Agent, or Firm* — Patterson & Sheridan, LLP

(57) ABSTRACT

A quick release mechanism for non-releasable clips is disclosed. The quick release mechanism allows for improved testing of the dimensional quality of manufactured parts having non-releasable mounting features, including clips, plugs, and pins. The mounting features can be reliably mounted for testing, and then removed from a mounting fixture without causing any injury or damage to the non-releasable mounting feature present in the device. The ease of removal is provided by the use of two horizontal segments (108, 110) positioned in a housing (104) to form a receiving aperture (112) for the mounting feature of the tested device. Moreover, the utilization of cables and cable stops to position and hold the horizontal segments of the quick release mount within their housing allows for a tested device to be quickly removed and the horizontal segments to be easily repositioned inside the circular housing where they can accept another manufactured device for dimensional evaluation.

18 Claims, 14 Drawing Sheets

(58) Field of Classification Search
USPC .......................................................... 33/1 BB
See application file for complete search history.

(56) References Cited

U.S. PATENT DOCUMENTS

| | | | |
|---|---|---|---|
| 8,857,776 B2* | 10/2014 | Chang | B65D 83/262 |
| | | | 248/312 |
| 9,442,349 B2* | 9/2016 | Hyers | F16B 2/10 |
| 9,611,875 B2* | 4/2017 | Likosar | A63C 11/02 |
| 2008/0143030 A1 | 6/2008 | Roth | |
| 2011/0266409 A1 | 11/2011 | Warrick et al. | |
| 2014/0003862 A1* | 1/2014 | Shi | F16M 13/022 |
| | | | 403/322.4 |

* cited by examiner

QUICK RELEASE MECHANISM FOR NON-RELEASABLE CLIPS

BACKGROUND OF THE INVENTION

Field of the Invention

This application relates to fixtures. In particular, this application relates to the design and use of a fixture having a quick release functionality which can be used in connection with parts designed to have no built-in release mechanism.

Description of the Related Technology

In many industries, measurement fixtures are used to verify the dimensional quality parts used. For example, in the automotive industry, measurement fixtures are used to verify the dimensional quality of parts of the car. Automobile parts are often manufactured out of materials which can deform when not supported in the position that those parts will ultimately be positioned on an automobile. For example, many automobile parts are now manufactured out of plastics or other composites which are flexible and can bend when subject to gravitational forces.

When measuring automobile parts to verify their dimensional quality, they are often held in place by a fixture. The fixture is typically designed to be a true representation of the relevant portion of the automobile, for example, the portion which receives the measured part and supports it after installation. Ideally, the fixture will not suffer from dimensional errors which can often be introduced during the automobile manufacturing process. Thus, the fixture will be optimally a real—life representation of the ideal error—free automobile.

Many automobile parts are mounted on the automobile using single-use fasteners which are designed to be inserted but not removed. One example of these types of mounts are plug like plastic pins (commonly referred to as "clips" or "plastic clips") which are designed for one-direction use, and are intended to be inserted into a cavity without any design capability for removal. Because of their inability to be removed easily, it can be quite difficult to make fixtures for parts that are mounted with clips. This is because once the part is mounted on the fixture, the part is designed not to be released.

SUMMARY

In one embodiment, quick release mechanism for non-releasable clips is provided. The quick release mechanism may include a base plate and a housing positioned on the base plate. The quick release mechanism may further include an upper horizontal segment and a lower horizontal segment. The upper horizontal segment and the lower horizontal segment may be removably positioned in the housing to cooperatively form an aperture. The aperture may be configured to receive a non-releasable clip. The upper horizontal segment and the lower horizontal segment are separable when removed from the housing to allow substantially unforced removal of the non-releasable clip.

In another embodiment a method of verifying dimensional quality of a manufactured part using a quick release mount is provided. The method may include positioning an upper horizontal segment and a lower horizontal segment within a housing, wherein the upper horizontal segment and the lower horizontal segment cooperatively form an aperture providing access to the housing. The method may further include tensioning at least one cable having a cable stop on end thereof, wherein the cable stop is positioned within a wide housing area of a cable housing and the cable extends through a channel beneath the wide housing area such that it is coupled to a tensioning control device, and attaching the manufactured part to the quick release mount by inserting a non-releasable clip into the aperture providing access to the housing. The dimensional quality of the mounted manufactured part may be tested, and tension on the at least one cable is released. The method further may include removing the upper horizontal segment and lower horizontal segment from the housing by pulling the manufactured part away from the housing, separating the upper horizontal segment from the lower horizontal segment, and removing the manufactured device from the aperture.

In yet another embodiment, a quick release mechanism for non-releasable clips is provided. The mechanism may comprise a base plate and a housing positioned on the base plate. The mechanism may further include a first horizontal segment, a second horizontal segment, and a hinge portion connecting the first horizontal segment and the second horizontal segment. A spring may also be included which is configured to assist movement of the first horizontal segment and the second horizontal segment, and the first horizontal segment and the second horizontal segment are removably positioned in the housing to cooperatively form a aperture. The aperture may be configured to receive non-releasable clip, and the upper horizontal segment and the lower horizontal segment are separable when removed from the housing to allow substantially unforced removal of the non-releasable clip.

DETAILED DESCRIPTION OF CERTAIN INVENTIVE EMBODIMENTS

The inventors have recognized a need for fixtures which allow for a cavity to be a functional replica of the real-life part represented by the fixture, but at the same time allowing for the part being mounted to be easily released from the fixture after its dimensional quality has been tested and ascertained. In order to meet this need, the inventors have designed a quick release mechanism for non-releasable clips. In some embodiments, the quick release mechanism is made up of two "half-moon" shaped parts positioned in a housing which are held together to together form a receiving cavity for the plastic clip. When the plastic clip is inserted, it snaps into place and is secured just as it would be in a real-life context. However, unlike the real-like part which would permanently secure the clip inside the cavity (due to the one-way design of the clip), the two half-moon parts may be removed from their housing which allows them to separate and release the plastic clip. The half-moon parts may then be placed back into their housing so that the fixture may receive another mounted part. The inventors have further recognized that additional benefits may be achieved by using steel cables to hold the half-moon parts in the housing and together, using a daisy-chain configuration which allows a single cable system to simultaneously tension and release the parts. Detailed examples of these inventive embodiments are set forth below.

Figure 1:
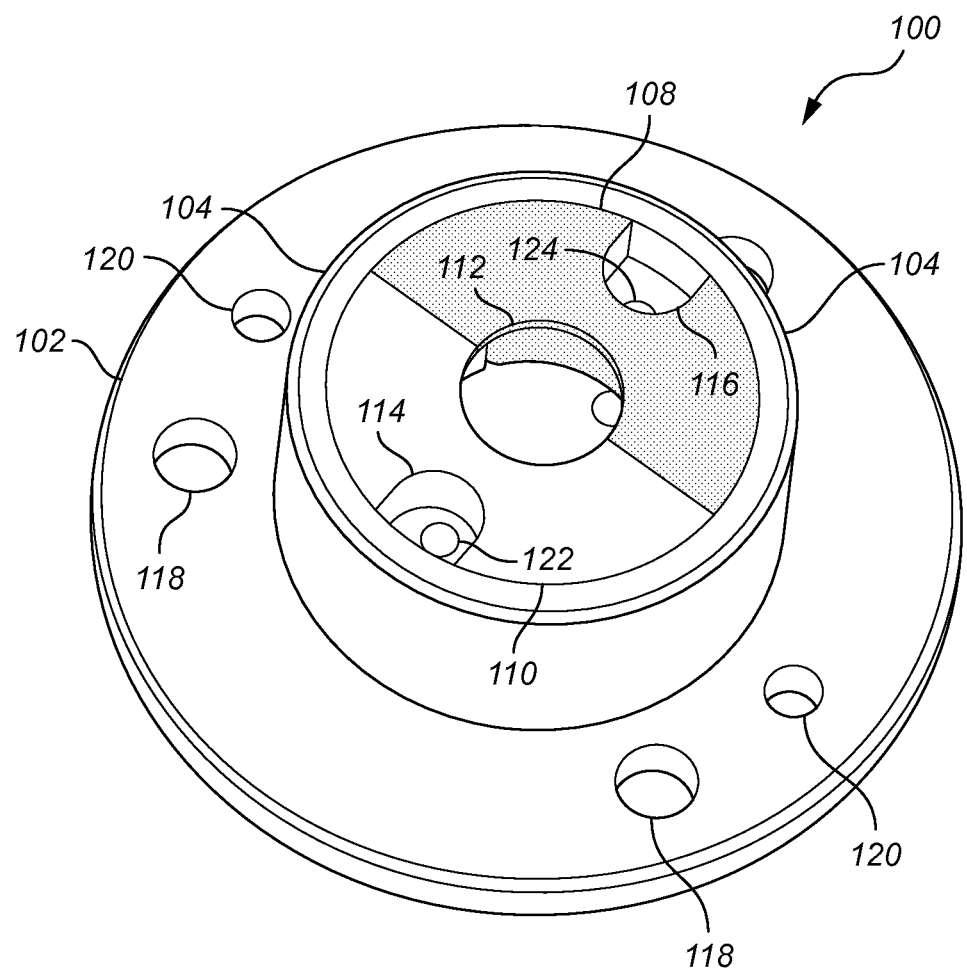
FIG. 1 is a top, perspective view of a quick release mechanism according to one or more embodiments disclosed herein.

Turning now to FIG. 1, an example of a quick release mount 100 is provided. The quick release mount 100 includes a base plate 102, the base plate 102 may be made out of metal, plastic, or some other material. Positioned on the base plate 102 may be a circular housing 104. The circular housing 104 may also be fabricated from sheet metal, plastic, a composite, or some other material. The circular housing extends out from the sheet metal base plate 102 in a direction substantially perpendicular to the surface of the base plate 102.

Positioned within the circular housing 104 are an upper horizontal segment 108 and a lower horizontal segment 110. The upper horizontal segment 108 and the lower horizontal segment 110 are in a position within the circular housing 104. As such, they are positioned against each other with each generally having a half-moon shape and together forming a circular structure. The upper horizontal segment 108 and the lower horizontal segment 110 cooperate to form an aperture 112 (which may also be referred to as a cavity 112). Depending on the particular clip purpose and design, the cavity may be circular, rectangular, triangular, or some other shape. The aperture 112 may be configured to receive a pin or clip and secure the pen or clip within its confines. The outer surface of the upper horizontal segment 108 and the lower horizontal segment 110 may each include a cable housing. In this particular example, the lower horizontal segment 110 includes a cable housing 114. The upper horizontal segment 108 includes a cable housing 116. The cable housings may include a wide housing area that extends to a first depth. At the bottom of the wide housing area, a smaller aperture or channel 122, 124 is present. The smaller aperture is narrower than the wide housing area. The smaller aperture 122, 124 extends all the way through each horizontal segment, respectively so that the cable housing includes an opening on both the top surface (a larger opening) and the bottom surface (a smaller opening) of each horizontal segment.

As will be discussed in further detail below, the cable housings may be configured to allow the upper horizontal segment 108 and the lower horizontal segment 110 to be slidably attached to cabling. Further, the cabling may include cable stops which prevent the horizontal segments 108, 110 from falling off of the cabling, and allowing the cables in cooperation with the cable stops to be used to exert downward pressure against each of the horizontal segments. This downward pressure may result in the horizontal segments 108, 110 being held firmly within the housing 104.

The quick release mount 100 may also include one or more large holes 118. In this particular embodiment, the holds are threaded holes. However, a skilled artisan will readily appreciate that the hold may, in some embodiments, not be threaded. The threaded holes 118 may be used to receive installation screws or other fastening hardware in order to install the quick release mount 100 on a larger piece of equipment in order to mimic the real-world environment in which a tested part may be installed. In addition, the quick release mount 100 may also include one or more smaller holes 120 (which also may, or may not, be threaded) which may perform a similar function and/or may use to provide additional options for placement of the quick release mount 100 within a testing environment.

Figure 2:
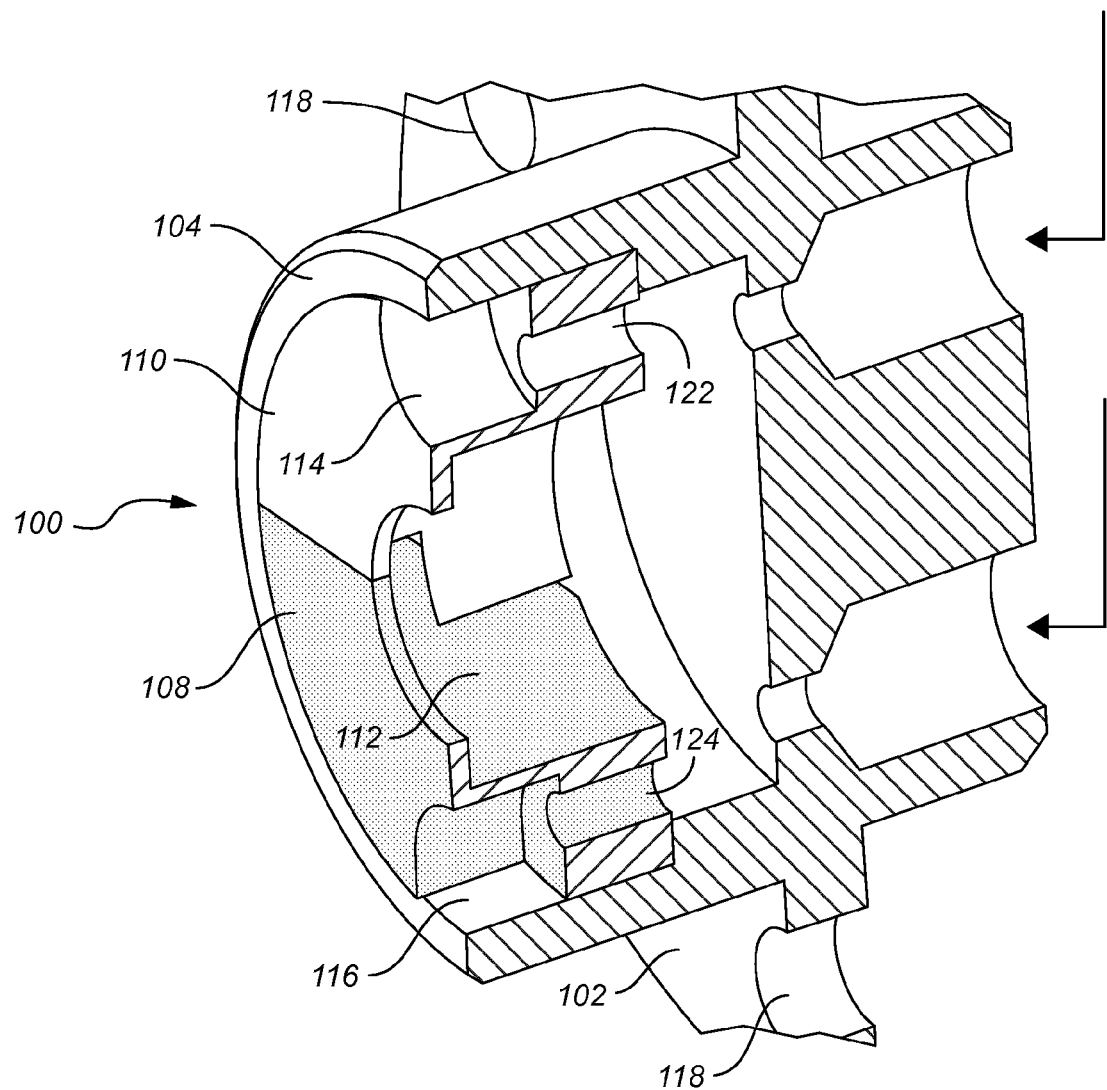
FIG. 2 is a cutaway view of the quick release mechanism from FIG. 1.

FIG. 2 is a cutaway view of the quick release mount 100 shown in FIG. 1. In this particular view, the quick release mount 100 is in a vertical disposition, as if to receive a plastic clip oriented perpendicular to the ground. As shown, the quick release mount 100 includes the base plate 102 which is positioned as an outer concentric circle to the circular housing 104. The first horizontal segment 108 is shown inserted into the circular housing 104 on top of the second horizontal segment 110 to form the clip receiving aperture 112. At a location 90° from the intersection of the first horizontal segment in the second horizontal segment, the cable housings 114, 116 are shown. Inside the cable housings the smaller apertures are visible, and extend throughout the entire quick release mount thereby providing a point of entry for a retaining cable from the rear portion of the device.

Figure 3:
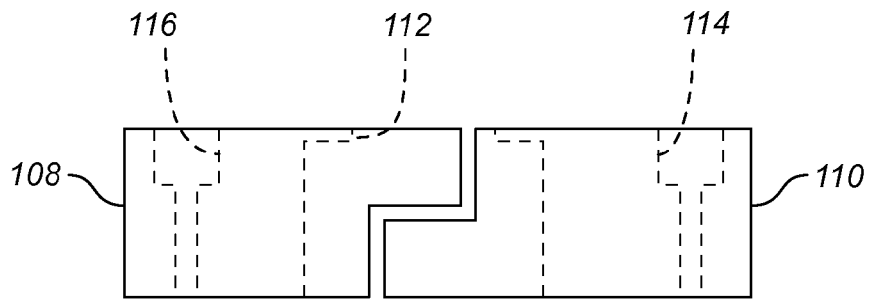
FIG. 3 is a simplified, side view of the horizontal segments of a quick release mechanism.

As discussed above, the upper horizontal segment 108 may restrict movement of the lower horizontal segment 110 by having a portion which extends out over a corresponding portion of the lower horizontal segment 110. FIG. 3 provides a simplified side view of this configuration. As shown, the upper horizontal segment 108 is shaped so that its center portion extends over the corresponding center portion of the lower horizontal segment 110. The center portion of the upper horizontal segment 108 can be used to apply pressure against the center portion of the lower horizontal segment 110 in order to keep it held in place and restrict its movement. When the two horizontal segments are held together in their movement is restricted, a plastic clip or 10 may then be inserted into the cavity 112 and will be retained to their so long as pressure is applied. Also shown in this view are the cable housings 114, 116. As previously discussed, retaining cables having cable stops may be positioned into these housings which allow for pressure to be exerted against them to hold them in place and restrict their movement during the fitting process.

Figure 4A:
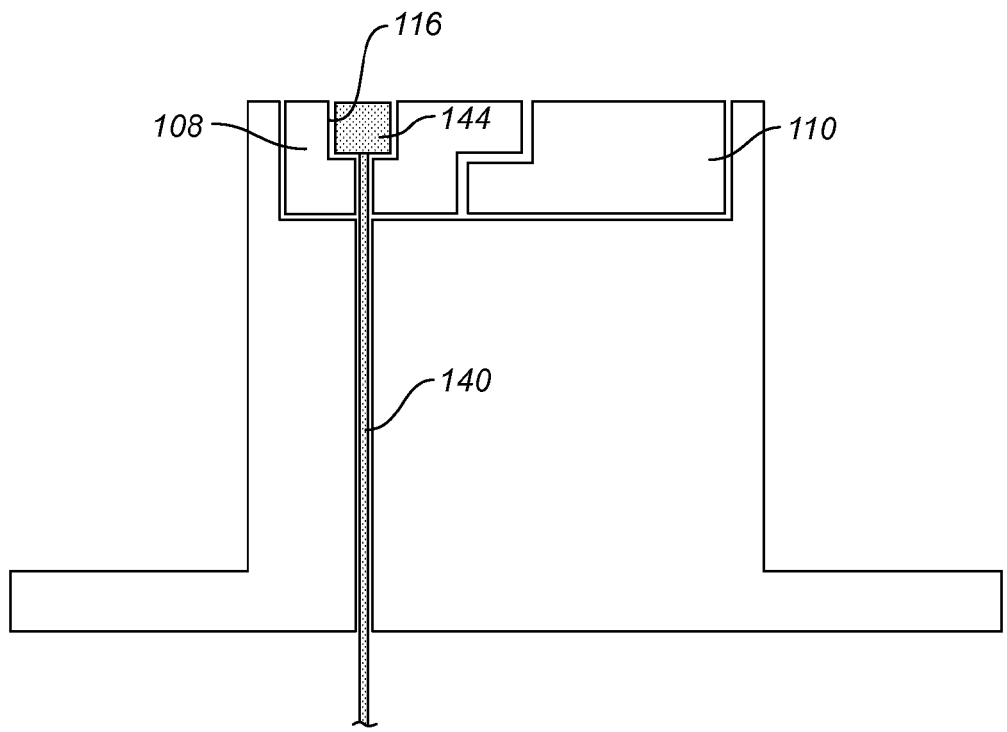
FIG. 4A is a simplified side view of a quick release mechanism having a single cable stop configuration.

FIG. 4A shows an example of how the cable may be used to exert pressure against the upper horizontal segment in order to restrict movement of the quick release mount while it is positioned within the circular housing 104. In this particular example, a cable with a cable stop is used to apply pressure against the upper horizontal segment. As shown, the cable 140 extends through the cable housing and the small aperture located within the cable housing through the quick release mount extending out of the base plate 102. The cable is attached to a cable stop 144 which fits within the housing 116, but is too large to extend into the smaller aperture through which the cable 140 is threaded. Thus, when pressure is applied to the cable by pulling it away from the upper surface of the quick release mount, the cable stop 144 causes the upper horizontal segment 108 to apply pressure against the lower horizontal segment 110. When the pressure has been applied, the freedom of movement of both the upper horizontal segment 108 and the lower horizontal segment 110 are restricted, and the clip receiving aperture 112 is positioned to accurately replicate a standard receiving hole for a plastic pin or clip.

Figure 4B:
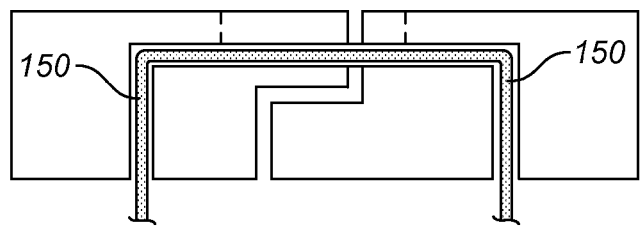
FIG. 4B is a simplified side view of a quick release mechanism having a double cable stop configuration.

Turning now to FIG. 4B, a simplified view of a second configuration of using a cable to retain the quick release mount within its housing shown. In this example, cable stops may be positioned in the cable housing of the lower horizontal segment, as well as the cable housing of the upper horizontal segment. Each of the cable stops is attached to a single cable 150. The single cable 150 runs through both the upper horizontal segment 108 and the lower horizontal segment 110. Thus, tension may be applied to both ends of the cable in order to exert downward pressure on both the upper horizontal segment 108 and the lower horizontal segment 110.

Figure 5A:
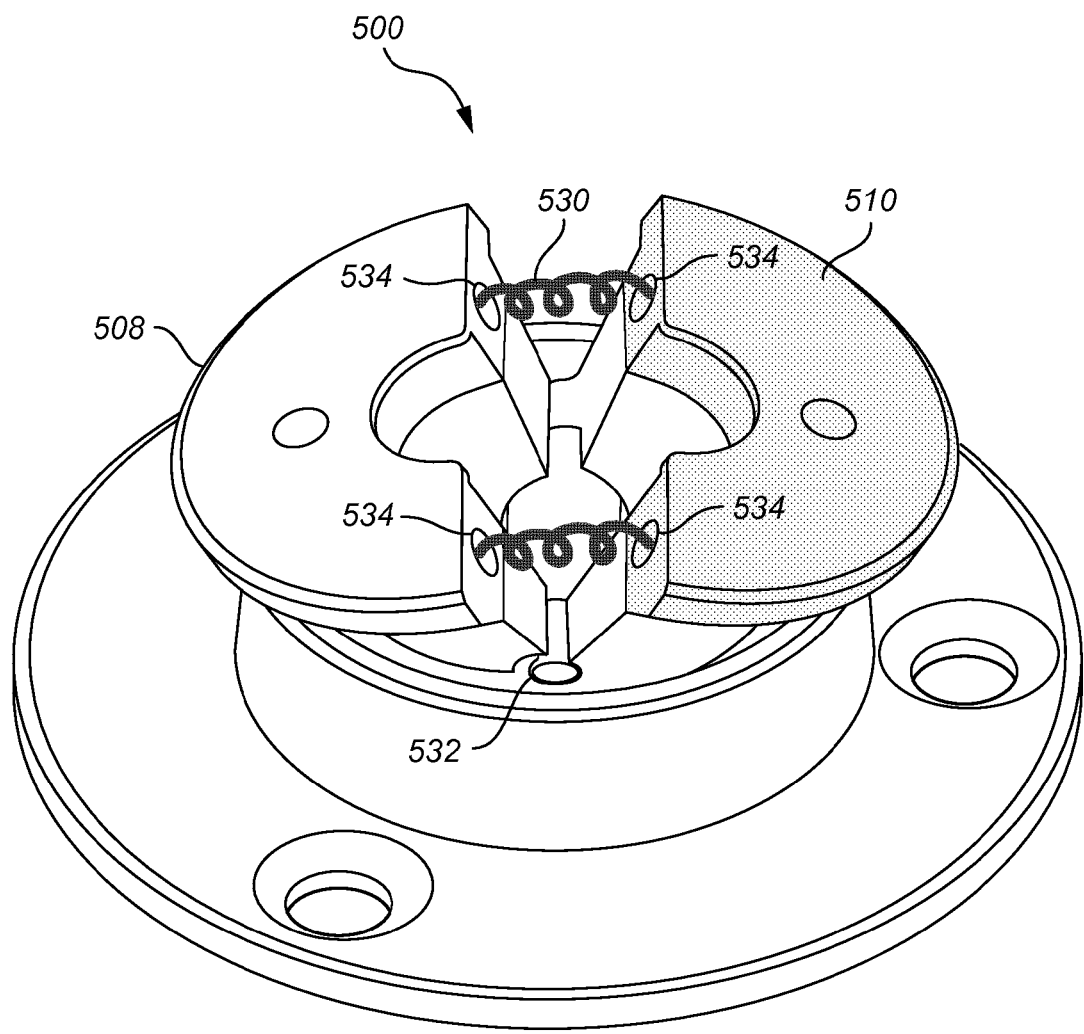
FIGS. 5A-5C are perspective and cutaway views of another embodiment of quick release mechanism.

Turning now to FIG. 5A, an example of another embodiment of a quick release mount 500 is provided. Although similar in many respects to the quick release mount 100 shown in FIG. 1, in this particular embodiment, the quick release mount 500 includes a spring mechanism 530 which may be positioned and fixed within a spring housing, and be used to exert pressure on the first horizontal segment 508 and the second horizontal segment 510. When the first horizontal segment and second horizontal segment are brought together, they form a clip receiving aperture similar to that discussed above in connection with FIG. 1 and FIG. 2. The half-moon shaped horizontal segments 508, 510 may be held together at their base by a hinge component 532. The spring mechanism 530, in cooperation with the hinge component 532, may assist in bringing the horizontal segments together when they are placed within the circular housing of the base plate, and depending upon the specific embodiment, it may further assist pulling the horizontal segments apart when they are positioned outside of the circular housing of the base plate.

Figure 5B:
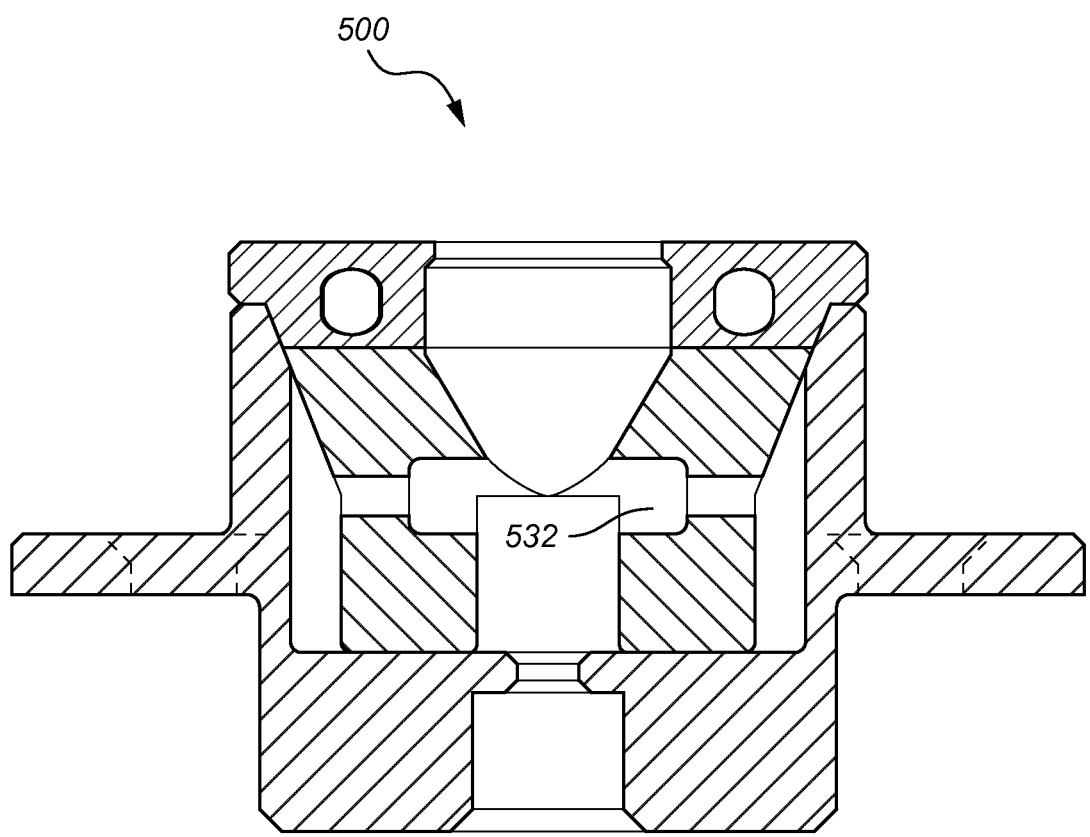
Figure 5C:
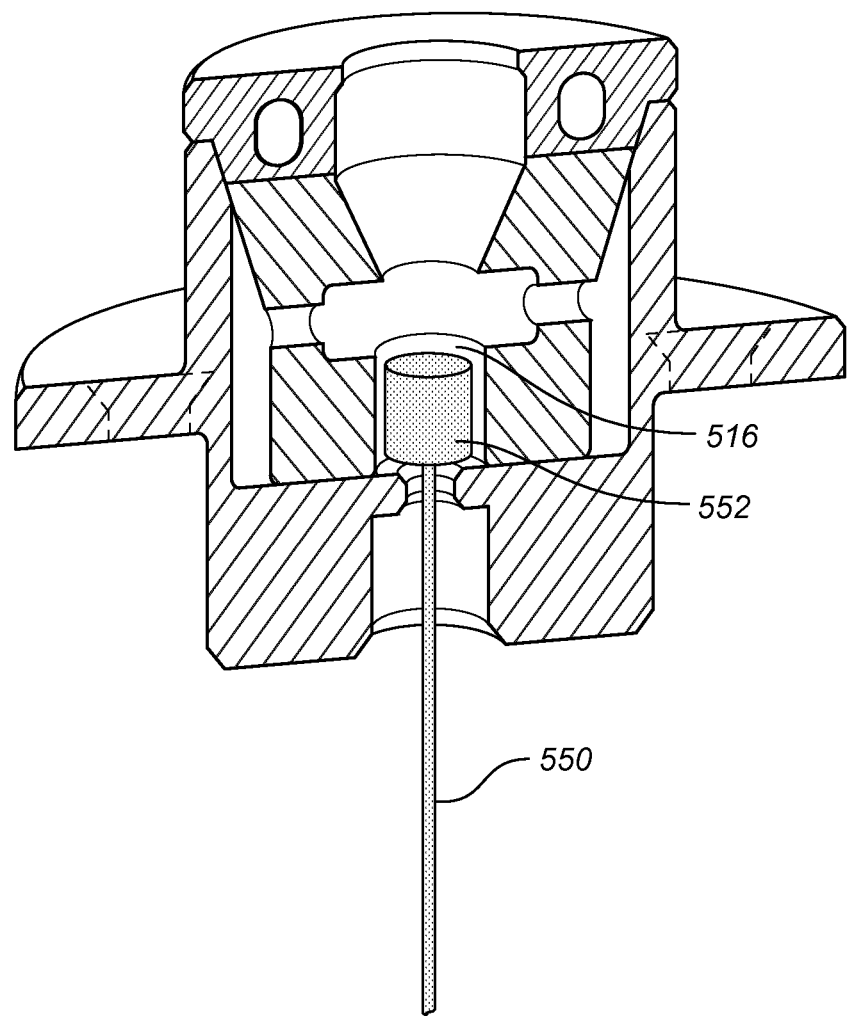

FIG. 5B provides a cutaway view of the quick release mount 500 shown in FIG. 5A. In this particular view, the quick release mount 500 is in a vertical disposition similar to that shown in FIG. 2 above. In this view, the quick release mount 500 is situated within the circular housing and spring mechanism 530 is not shown. As was the case with the quick release mount 100 shown in FIG. 1, the quick release mount 500 shown in FIG. 5A and FIG. 5B may be held within the circular housing using a retaining cable. FIG. 5C show an example of this configuration. As shown, the quick release mount 500 includes a cable stop 552 attached to a cable 150 and positioned within a cable housing 516. As with the quick release mechanism 100 discussed above, tension may be applied to the cable 550 extends through the in order to hold the horizontal segments 508, 510 of quick release mechanism 500 within the circular housing of the base plate.

Figure 6:
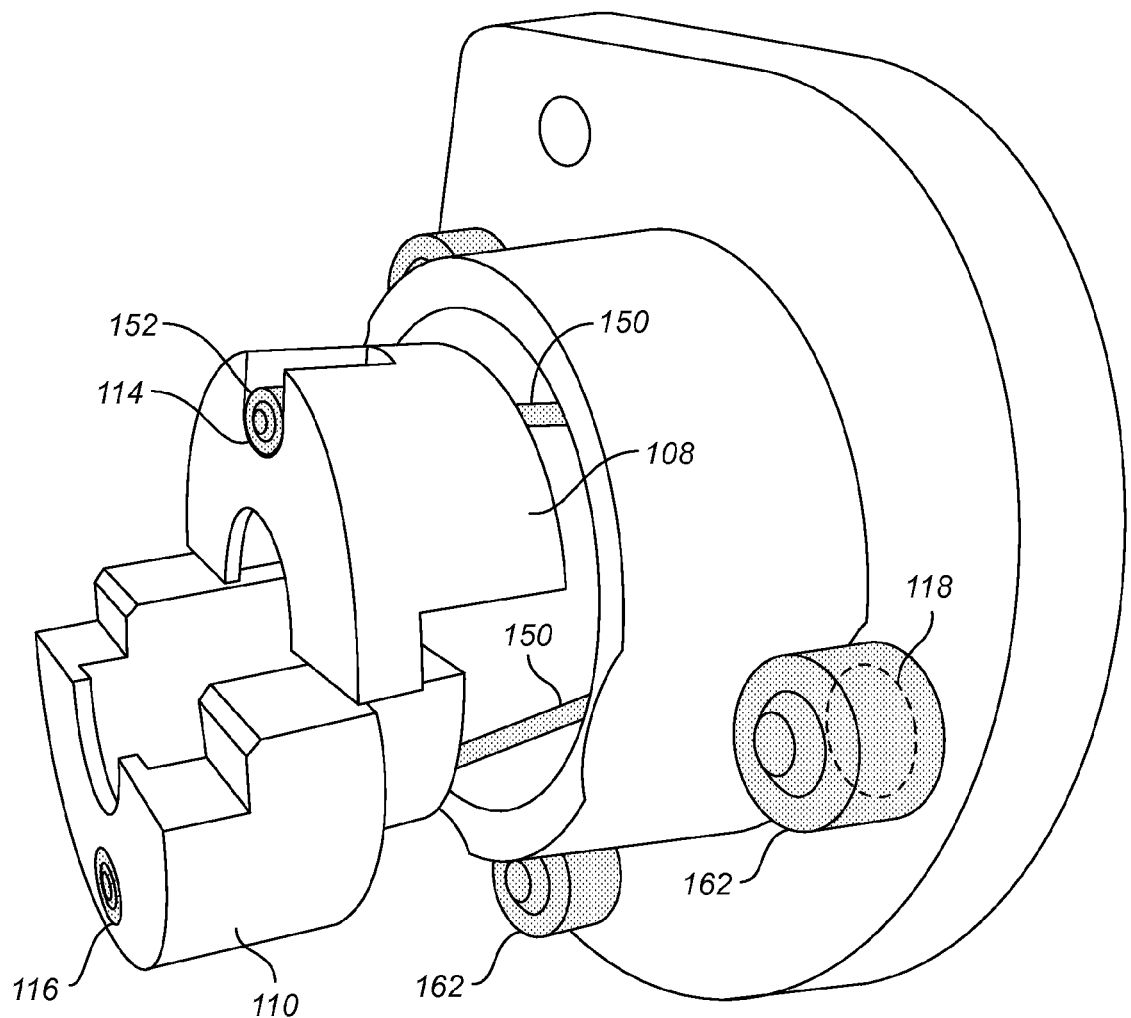
FIG. 6 is a side, perspective view of a quick release mechanism in a released state.

In some embodiments, the quick release mount 100 may be installed in a testing environment utilized for assessing dimensional quality of automobile parts. FIGS. 6-12 provide an illustration of one such embodiment. Although FIGS. 6-12 provide an illustration of the use of quick release mount 100 in a testing environment, the quick release mount 500 shown in FIGS. 5A and 5B may also be deployed in a similar fashion. FIG. 6 provides a side perspective view of a quick release mount 100 which has been installed on a supporting frame according to one or more embodiments. As shown, the quick release mount 100 is in a released position, such that the upper horizontal segment 108 and the lower horizontal segment 110 are both outside of the circular housing 104. Because they are not held within the housing 104, they are disconnected from one another, and the clip receiving cavity 112 is not intact. As a result, in this particular view, a plastic clip would not be effectively retained within the cavity 112 because it is not positioned within the circular housing 104.

In this view provided by FIG. 6, the cable housing 114 has the cable stop 152 located within it. Similarly cable housing 116 has a cable stop 152 positioned within it (although this cable stop is not visible in this particular view). The cable stops 152 are attached to cables 150 which extend through their respective housings and into the cavity formed by the circular housing 104. In addition, the quick release mount 100 has been installed on a supporting frame using installation bolts 162 which are inserted through the large screw holes 118.

Figure 7:
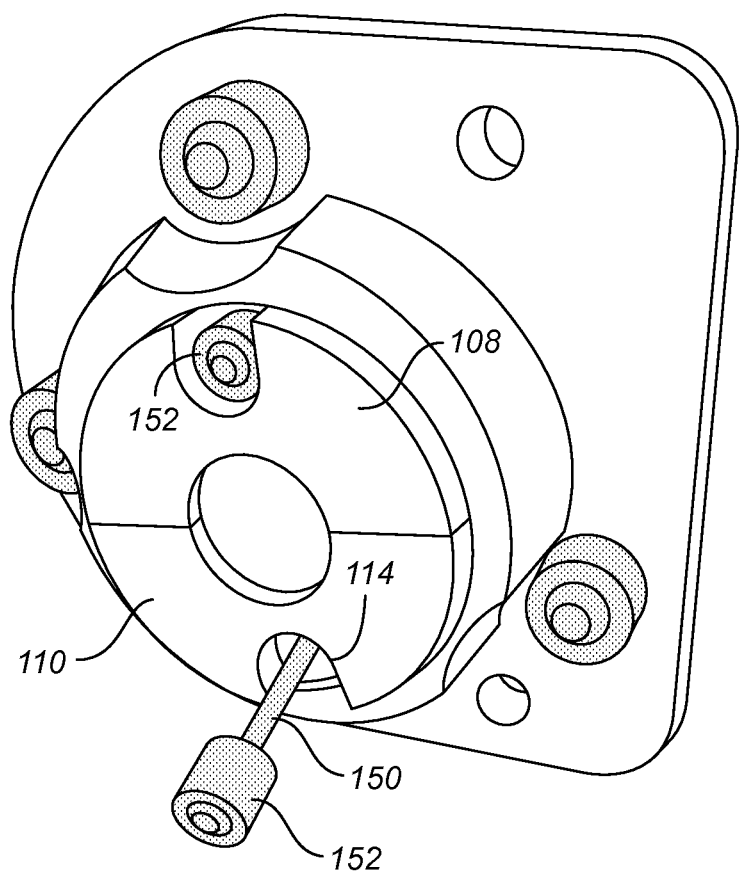
FIG. 7 is an example of the quick release mechanism with the horizontal segments inserted into the housing.

Turning now to FIG. 7, the quick release mount 100 shown in FIG. 6 has been moved into its mounting position, with the upper horizontal segment 110 and the lower horizontal segment 108 each positioned within the circular housing 104 and cooperatively forming the aperture 112 to receive a clip. As shown, the cable stop 152 in the cable housing 114 of the upper horizontal segment 108 is under tension and is pulling the upper horizontal segment 108 into the housing 104. The lower horizontal segment 110 is also within the housing 104, but its cable 150 is not under tension. As a result, the cable stop 152 is slack and outside of the cable housing 114 in the lower horizontal segment 110. However, when tension is added to the cable 150, the cable stop 152 will retract into the cable housing 114, providing additional pressure downward into the circular housing 104. With this additional downward pressure, the quick release mount 100 is suitably placed to receive a plastic clip or plastic pin.

Figure 8:
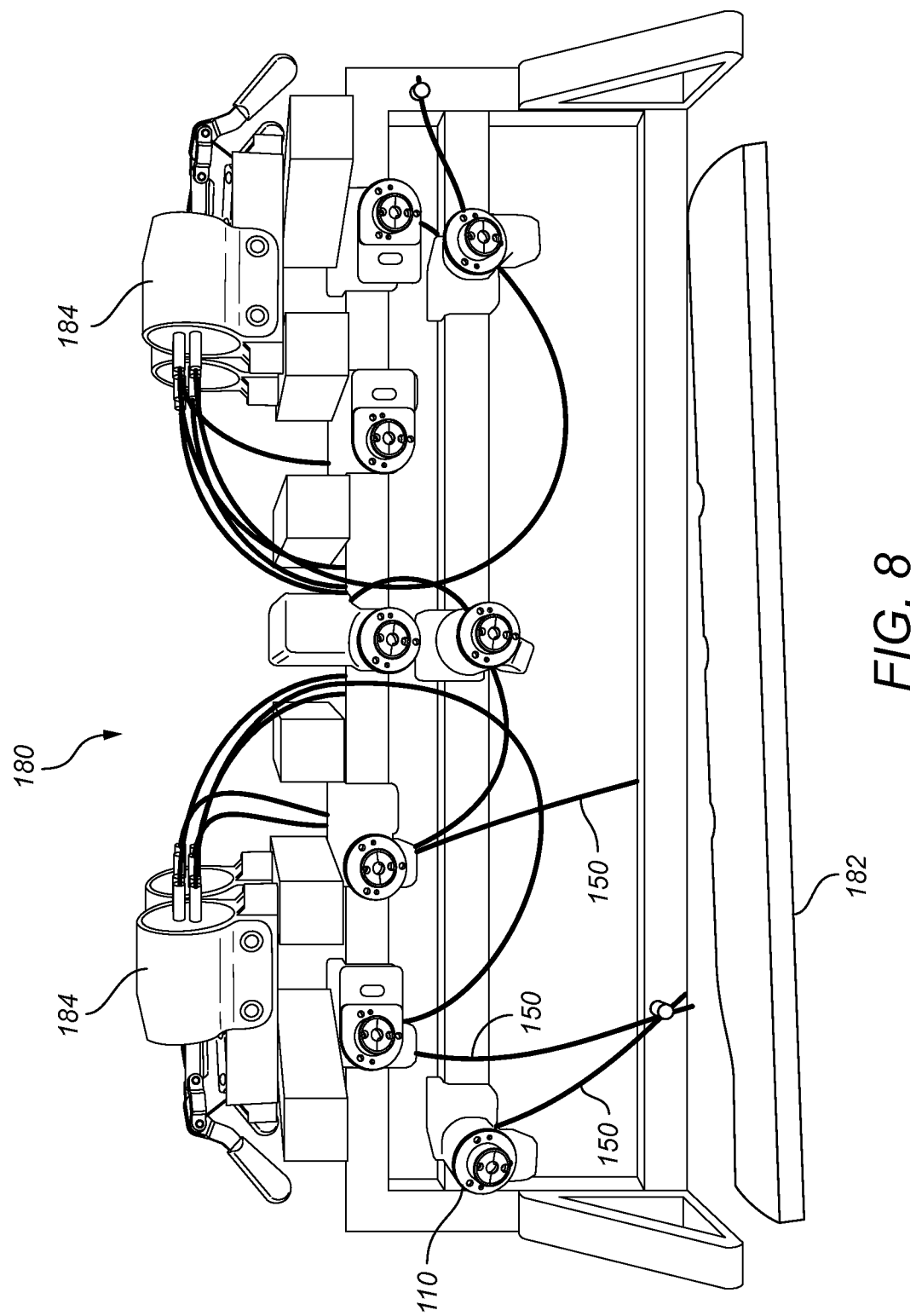
FIG. 8 is an example of a dimensional quality testing fixture which uses a quick release mechanism and a series of cables to mount parts for testing.

FIG. 8 is an illustration of the use of a series of quick release mount 100 on a fixture 180 for testing the dimensional quality of a plastic bumper shield 182 which is typically installed in an automobile. The plastic bumper shield 182 is designed to be installed in an automobile using plastic clips. Here, a testing fixture 180 provided which locates the quick release mounts 100 in the specific locations where the plastic clips would be inserted on the body of a car.

As shown, there are eight quick release mounts 100. Each of the quick release mounts is shown in its mounting position, with its upper horizontal segment and lower horizontal segment each inserted into and positioned within the circular housing 104. The testing fixture 180 includes one or more cables 150 which are used to hold the upper and lower horizontal segments 108, 110 within the circular housing so that the plastic bumper shield 182 can be mounted on the testing fixture 180. In some embodiments, the tension created by the cable (or cables) may be increased or decreased using a controller 184 which can be used to create tension and/or slack in the cable 150. Depending on the specific implementation, a single cable 150 may be used by being threaded through each of the individual quick release mounts 100 installed on the testing fixture 182. Alternatively, several different cables may be used, and may be controlled individually or in groups using the controller 184.

Figure 9:
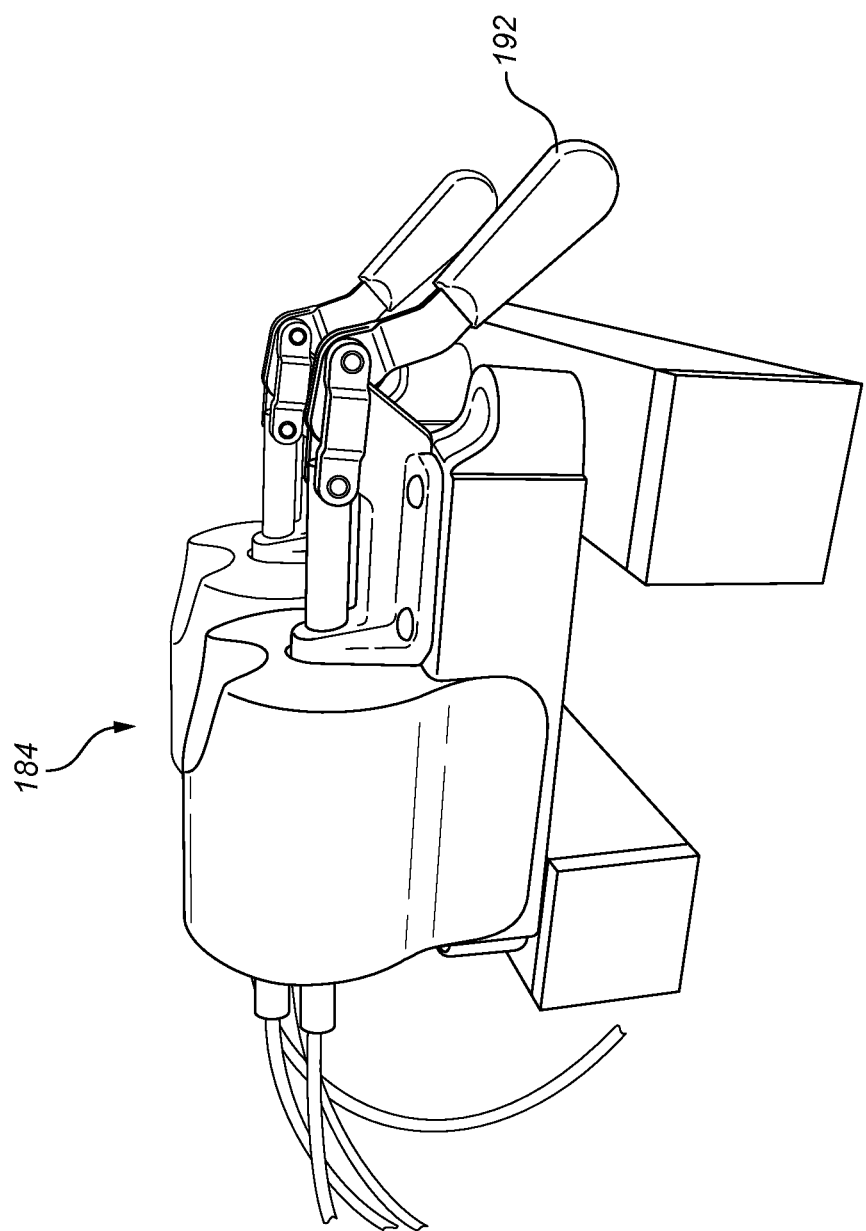
FIG. 9 is an example of a controller which can be used to create tension and slack in the cables shown in FIG. 8.

Turning now to FIG. 9, a more detailed view of the controller one any four is provided. In this particular view, the controller has been activated (by lowering the control lever 192) to create tension in the cable(s) 150 in preparation for mounting of the plastic bumper shield 182 on the testing fixture 180. Because the controller has created tension on the cables 150, the upper horizontal segment 108 and the lower horizontal segment 110 of the quick release mount for held firmly within the circular housing 104 providing a real life representation of an error-free automobile upon which testing may be conducted. Although a controller has been utilized in this particular example, a skilled artisan will readily appreciate that other types of equipment and machinery, such as hydraulics, manual levers, reels, coils, or some other equipment may be used to control tension in the cables 150 in order to create the appropriate testing environment.

Figure 10:
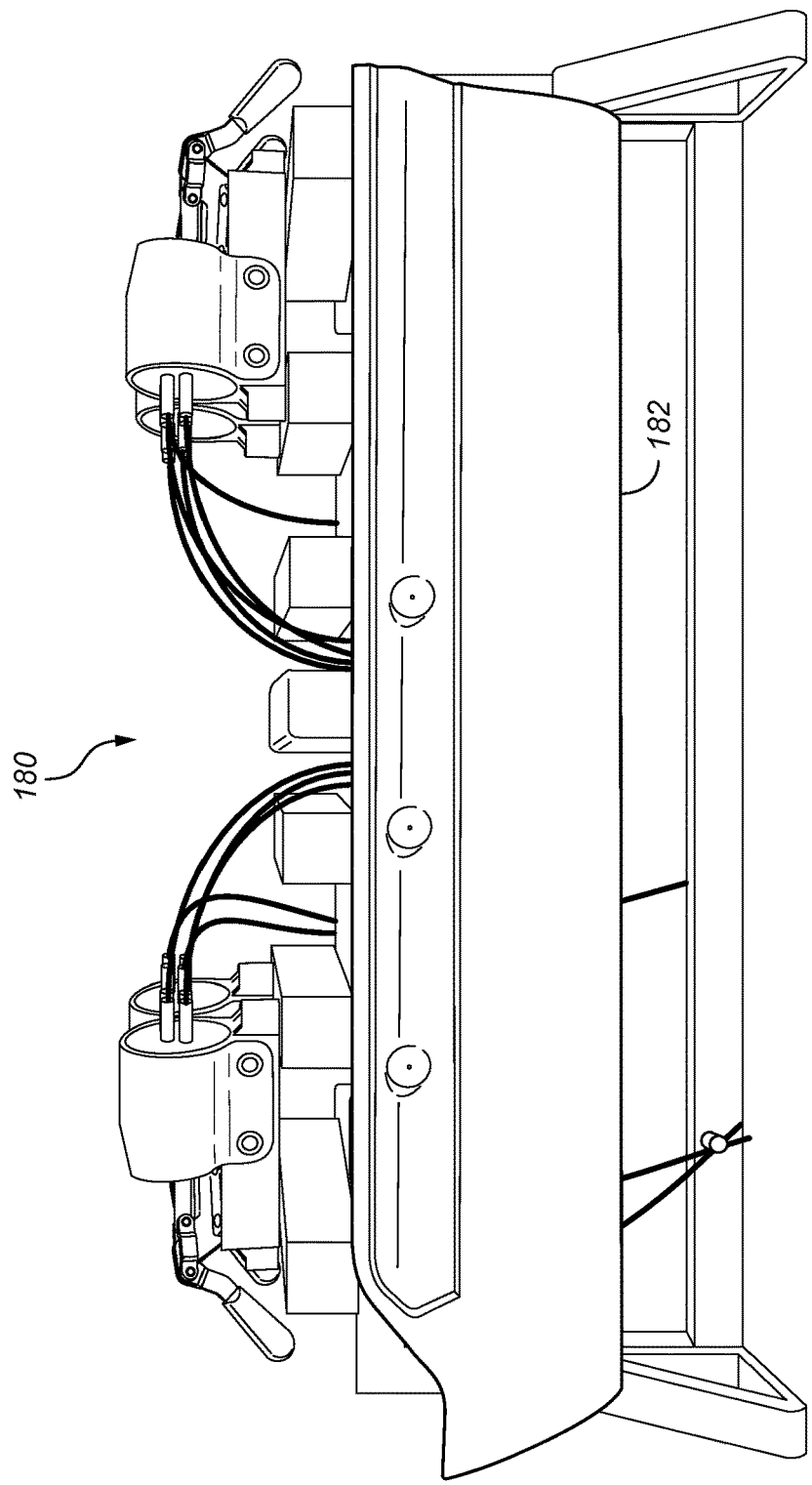
FIG. 10 depicts an example of a fully mounted automobile door shield on the testing fixture of FIG. 8.

FIG. 10 depicts the plastic bumper shield 182 attached to the testing fixture 180 using the quick release mounts 100 installed on the testing fixture. While the plastic bumper shield 182 is mounted on the fixture 180, pressure from the controller 184 causes the cables 150 to hold the upper horizontal segment 108 and lower horizontal segment 110 in place, simulating the permanent one way mount that occurs when the plastic bumper shield 182 is mounted in a production environment. At this point, measurement operations may be conducted on the plastic bumper shield 182 in order to determine whether it meets the appropriate manufacturing standards for utilization in the production environment.

Once all of the testing has been conducted on the mounted plastic bumper shield, the bumper shield may then be removed from the testing fixture 180. As discussed above, the plastic clips which are formed and/or attached to the bumper shield 182 are designed for one way use. In order to remove them from the testing fixture 180, the tension on the cable 150 may be released so that the upper horizontal segment 108 and lower horizontal segment 110 are able to be pulled out of the circular housing 104. Referring back to FIG. 6, when the upper and lower horizontal segments are removed from the circular housing 104, the aperture 112 through which the plastic clips have been inserted on each quick release mount becomes separated, thereby allowing the plastic clips to be easily dismounted. Because upper horizontal segment 108 and the lower horizontal segment 110 each are attached to the cable 150 using the cable stop 152, they suspended in the air rather than falling to the ground. This allows them to be easily gathered and reinserted into the circular housing for testing of the next plastic bumper shield 182.

Figure 11:
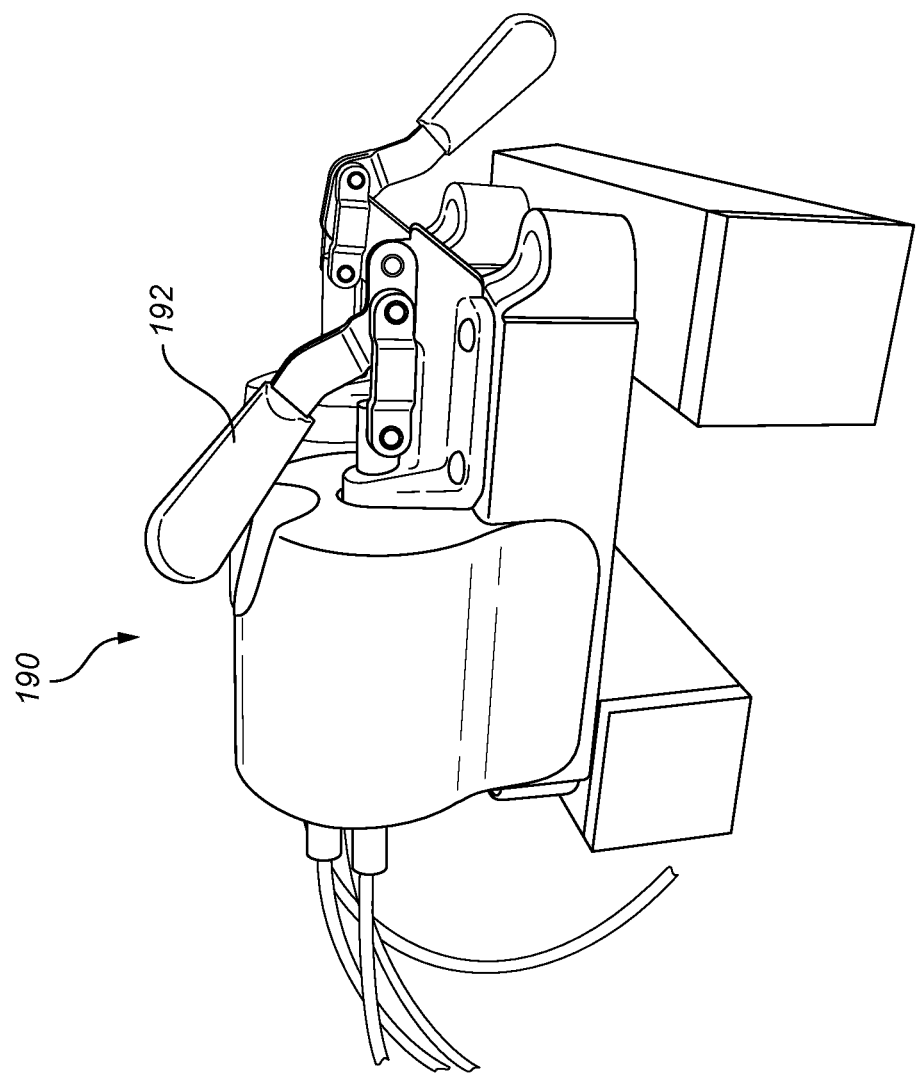
FIG. 11 is an example of a deactivated lever on the controller which removes tension and creates slack in the cables shown in FIG. 8.
Figure 12:
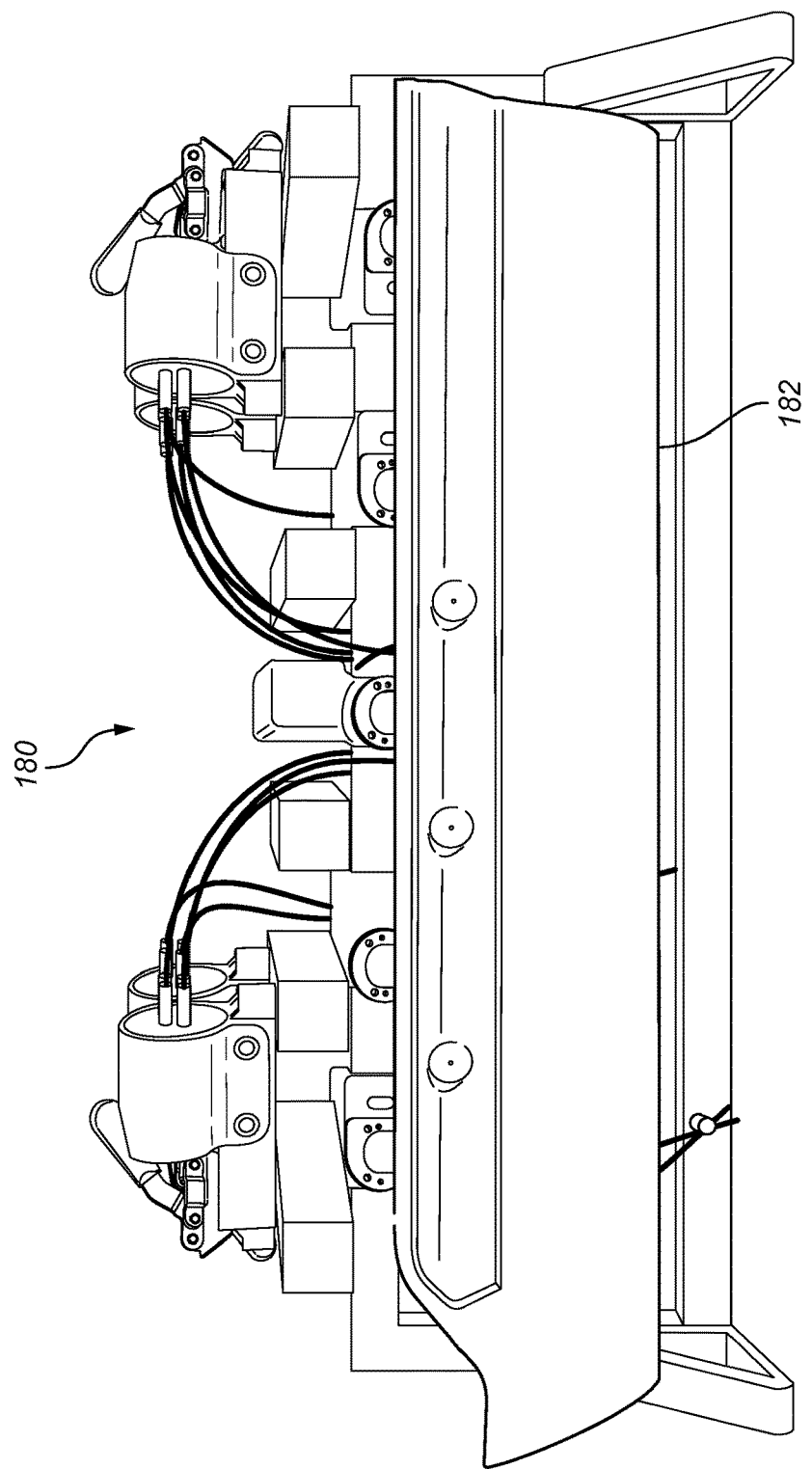
FIG. 12 is an example of an automobile door shield falling away from the quick release mechanisms as a result of the slack created by the controller.

In some embodiments, the tension on the cable 150 may be released by placing the control lever 192 of the controller 184 in its on activated position, as shown in FIG. 11. When the tension has been released, the plastic bumper shall 182 may be pulled away from the testing fixture 180. FIG. 12 shows the bumper partially removed from the release mounts, after the tension on the cable 115 has been slackened. As shown, the plastic bumper shield 182 has fallen off slightly from the quick release mounts 100 positioned on the testing fixture 108. Because it has fallen off slightly, the top portions of the base plate 102 of the quick release mounts 100 are each visible.

Figure 13:
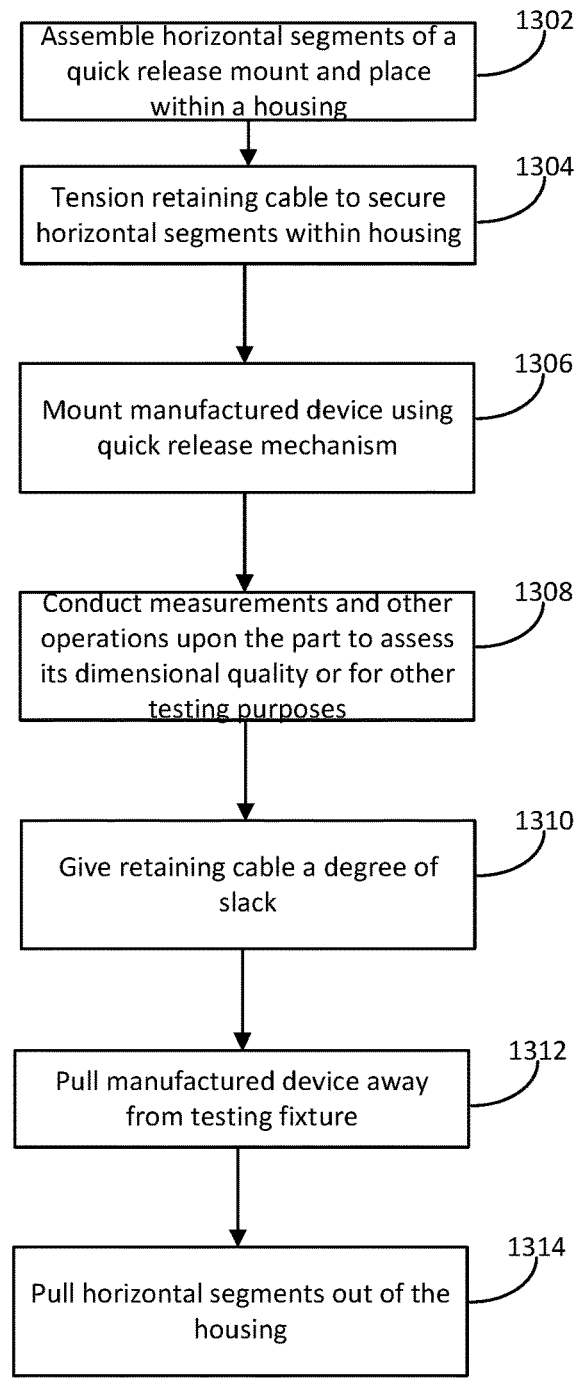
FIG. 13 is a flowchart illustrating one example of a process by which manufactured parts having non-releasable mounting features can be mounted on a testing fixture and tested for dimensional quality.

Utilizing the quick release mounts 100 described above, an improved process for verifying dimensional quality of manufactured items may be realized. FIG. 13 is a flowchart describing a process by which manufactured parts having non-releasable attachment mechanisms such as plastic clips, for example, may be evaluated for dimensional quality. The process begins at block 1302, where horizontal segments of a quick release mount such as quick release mount 100 are assembled and placed within a housing such as circular housing 104. Next, the process moves to block 1304. There a retaining cable such as cable 150 may be tensioned so that the assembled horizontal segments, such as upper horizontal segment 108 and lower horizontal segment 110, are secured within the housing.

The process that moves to block 1306 where the manufactured device being tested can be mounted using the quick release mechanism 100. As explained above, the manufactured device being tested may include plastic clips which can be inserted into a clip receiving aperture 112 formed cooperatively by the upper horizontal segment 108 and lower horizontal segment 110 within the circular housing 104. As further discussed above, for a given manufactured device, there may be one quick release mount, or several of them.

Once the manufactured device has been mounted, measurements and other operations may be conducted upon the part in order to assess its dimensional quality at block 1308, or for other testing purposes. Once the dimensional quality assessment and/or testing has been conducted, the process then moves to block 1310 where the retaining cable is given a degree of slack. Because the upper and lower horizontal segments are no longer held firmly in place within the circular housing, they may be removed from the circular housing. Thus, the process next moves to block 1312 where the manufactured device being tested may be pulled away from the testing fixture 180. As the manufactured device is pulled away from the testing fixture, the clip mechanism pulls the upper horizontal segment 108 and lower horizontal segment 110 out of the circular housing 104 at block 1314. Once the upper and lower horizontal segments are removed from the circular housing, they are no longer tied together, and a may be separated easily. This separation allows for the manufactured device being tested to be released from the horizontal segments without having to break the plastic clips used for attachment.

Utilizing the apparatuses and methods described above, dimensional quality of manufactured parts having non-releasable mounting features can be reliably mounted for testing, and then removed from a mounting fixture without causing any injury or damage to the non-releasable mounting feature present in the device. Moreover, the utilization of cables and cable stops to position and hold the horizontal segments of the quick release mount within their housing allows for a tested device to be quickly removed and the horizontal segments to be easily repositioned inside the circular housing where they can accept another manufactured device for dimensional evaluation.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A quick release mechanism for a non-releasable clip, comprising:
    a base plate;
    a housing positioned on the base plate;

an upper horizontal segment;

a lower horizontal segment; and a cable housing comprising a wide housing area configured to hold a cable stop and a channel extending from the wide housing area, wherein the channel is more narrow than the cable stop and wherein the channel is configured to receive a cable attached to the cable stop and guide the received cable beyond a rear portion of the base plate, wherein the upper horizontal segment and the lower horizontal segment are removably positioned in the housing to cooperatively form an aperture, and wherein the aperture is configured to receive the non-releasable clip, and wherein the upper horizontal segment and the lower horizontal segment are separable when removed from the housing to allow substantially unforced removal of the non-releasable clip.

2. The quick release mechanism of claim 1, wherein the cable stop in the cable housing is configured to exert pressure against the bottom of the wide housing area so as to hold the upper horizontal segment and the lower horizontal segment in the housing.

3. The quick release mechanism of claim 2, wherein the cable in the channel of the cable housing is configured to be tensioned by a controlling device, and wherein the tensioning of the cable results in the exertion of pressure by the cable stop in the cable housing against the bottom of the wide housing area.

4. The quick release mechanism of claim 1, wherein the housing is a circular housing.

5. The quick release mechanism of claim 1, wherein the base plate is a circular base plate.

6. The quick release mechanism of claim 1, wherein the quick release mechanism is configured to be installed on a testing fixture.

7. The quick release mechanism of claim 1, wherein the non-releasable clip comprises one of a plastic push pin, a plastic clip, or a plastic plug, and wherein the non-releasable clip lacks any built-in release mechanism.

8. A method of verifying dimensional quality of a manufactured part using a quick release mount, the method comprising:

obtaining a quick release mechanism comprising a base plate, a housing positioned on the base plate, an upper horizontal segment, a lower horizontal segment, and a cable housing;

positioning the upper horizontal segment and the lower horizontal segment within the housing, wherein the upper horizontal segment and the lower horizontal segment cooperatively form an aperture providing access to the housing;

tensioning at least one cable having a cable stop on end thereof, wherein the cable stop is positioned within a wide housing area of a cable housing and the cable extends through a channel beneath the wide housing area beyond a rear portion of the base plate such that it is coupled to a tensioning control device, wherein the channel is more narrow than the cable stop;

attaching the manufactured part to the quick release mount by inserting a non-releasable clip into the aperture providing access to the housing;

testing the dimensional quality of the mounted manufactured part;

releasing tension on the at least one cable;

removing the upper horizontal segment and lower horizontal segment from the housing by pulling the manufactured part away from the housing;

separating the upper horizontal segment from the lower horizontal segment; and removing the manufactured device from the aperture.

9. The method of claim 8, wherein the housing is a circular housing.

10. The method of claim 8, wherein the quick release mount is attached to a testing fixture.

11. The method of claim 8, wherein tensioning the at least one cable comprises actuating a controller coupled to the at least one cable.

12. The method of claim 8, further comprising suspending the removed upper horizontal segment and lower horizontal segment using the at least one cable.

13. The method of claim 8, wherein the non-releasable clip comprises one of a plastic push pin, a plastic clip, or a plastic plug, and wherein the non-releasable clip lacks any built-in release mechanism.

14. The method of claim 10, wherein the testing fixture is a representation of an automobile.

15. The method of claim 14, wherein the manufactured part comprises a plastic bumper shield.

16. The method of claim 8, further comprising repositioning the upper horizontal segment and lower horizontal segment within the housing.

17. The method of claim 16, further comprising re-tensioning the cables after the repositioning of the upper and lower horizontal segments.

18. A quick release mechanism for non-releasable clips, comprising:

a base plate;

a housing positioned on the base plate;

a first horizontal segment;

a second horizontal segment;

a hinge portion holding the first horizontal segment and the second horizontal segment together at a base of the first horizontal segment and a base of the second horizontal segment; and a spring configured to assist movement of the first horizontal segment and the second horizontal segment in cooperation with the hinge portion, wherein the first horizontal segment and the second horizontal segment are removably positioned in the housing to cooperatively form a aperture, and wherein the aperture is configured to receive non-releasable clip, and wherein the upper horizontal segment and the lower horizontal segment are separable when removed from the housing to allow substantially unforced removal of the non-releasable clip.

* * * * *